Figure 1:
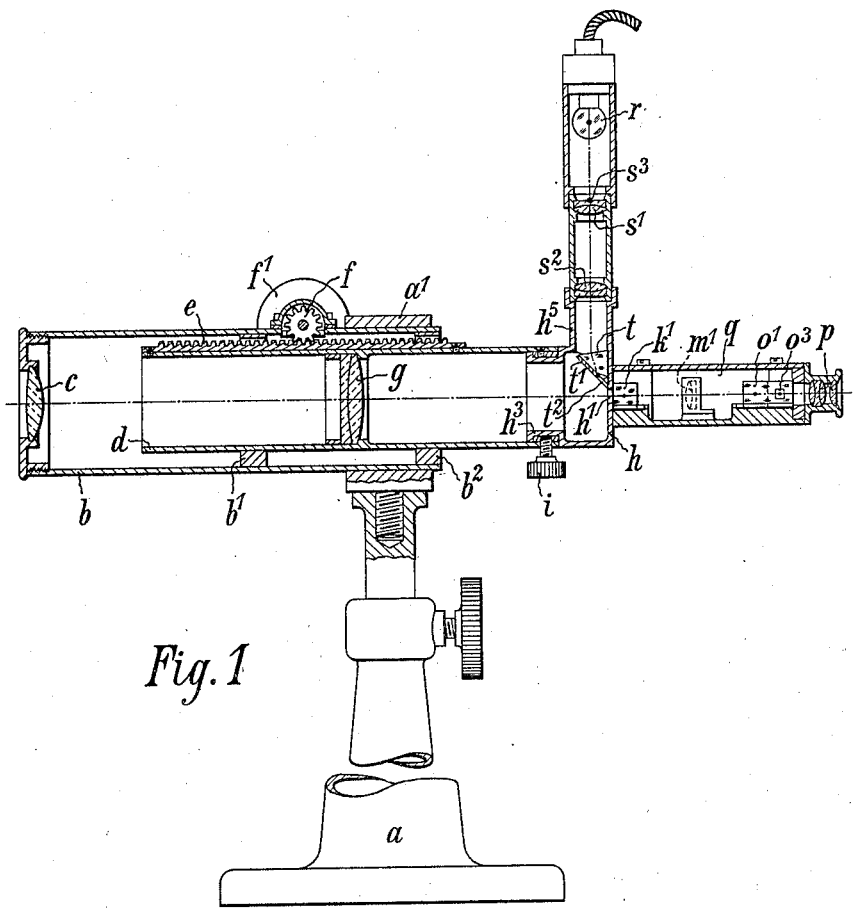

Nov. 27, 1923.  1,475,698
O. HENKER
APPARATUS FOR THE OBJECTIVE MEASUREMENT OF THE REFRACTIVE VALUE
OF THE PRINCIPAL POINT OF THE EYE
Filed Aug. 13, 1921

Inventor:
Otto Henker

Patented Nov. 27, 1923.

1,475,698

UNITED STATES PATENT OFFICE.

OTTO HENKER, OF JENA, GERMANY, ASSIGNOR TO THE FIRM CARL ZEISS, OF JENA, GERMANY.

APPARATUS FOR THE OBJECTIVE MEASUREMENT OF THE REFRACTIVE VALUE OF THE PRINCIPAL POINT OF THE EYE.

Application filed August 13, 1921. Serial No. 492,190.

(GRANTED UNDER THE PROVISIONS OF THE ACT OF MARCH 3, 1921, 41 STAT L., 1313.)

*To all whom it may concern:*

Be it known that I, OTTO HENKER, a citizen of the German Empire, residing at Jena, Germany, have invented a new and useful Apparatus for the Objective Measurement of the Refractive Value of the Principal Point of the Eye (for which I have filed an application in Germany, July 23, 1919, and England, July 5, 1920, Patent No. 148,754), of which the following is a specification.

The invention relates to an apparatus for the objective measurement of the refractive value of the principal point of the eye. The term refractive value of the principal point of the eye signifies, as is well known, the reciprocal value given in diopters of the distance of the far point from the front principal point of the eye.

The method, which is of itself known and is that on which the apparatus according to the invention is based, consists in this that by a collective lens system placed before the eye with relaxed accommodation an image of the illuminated background of the eye is formed and by means of a suitable observing device, which is displaceable along the optical axis, for instance an ocular, a microscope or a telescope magnifying glass, the locus of the image is sought. The fixing of the locus of the image and thereby the whole measurement is always fairly inaccurate with the apparatus of this kind known heretofore, as it is difficult to fix definitely that position of the observing device, in which the image presented in the ocular field of view is at its sharpest. According to the invention, a two hole diaphragm is introduced into the path of the rays, by forming a reduced, real image of a two hole diaphragm of suitable dimensions in the pupil of the eye, and the two ray pencil systems separated thereby are transmitted by means of suitable reflecting systems independently of one another to a common observing ocular in such a manner that in the ocular field of vision two separate partial images are obtained and the position of the image can be ascertained by coincidence of the two partial images. The combining of the two partial images in the same ocular field of view is effected in a known manner, for instance with the aid of a prism system containing a partially transparent, partially reflecting surface. The manner of subdividing the ocular field of view is immaterial. For instance, to each of the two partial images may be allotted half the field of view, so that the separating line of the two images, along which coincidence is to be brought about, is a diameter. If the apparatus is to be used for other research purposes, only a small segment of or a small section within the field of view of the first ray pencil system will be allotted to the second ray pencil system so as to retain for the observation as extensive a uniform image as possible. Furthermore, similarly as in the case of the so-called inverted image telemeters by an additional reflection one of the two images may be presented to the eye laterally inverted in the direction perpendicularly to the separating line, so that along the separating line an image and its reflected image are to be brought into coincidence.

By means of the two hole diaphragm, with central observation two ray pencil systems lying symmetrically to the optical axis are separated, each of which forms the corresponding partial image. By coincidence of the two partial images the refractive value of the principal point of the eye is thus obtained in that meridional plane of the eye, which passes through the centres of the two diaphragm images in the pupil of the eye. In order to be able to measure the power in any meridian and thereby to ascertain the magnitude of astigmatic defects, e. g. that part of the apparatus next to the observer may be arranged to rotate with the two hole diaphragm and the illuminating aperture about the optical axis and be combined in a known manner with an arrangement permitting of the angle of the meridional plane set during measurement to be measured with the zero meridian.

Figure 2:
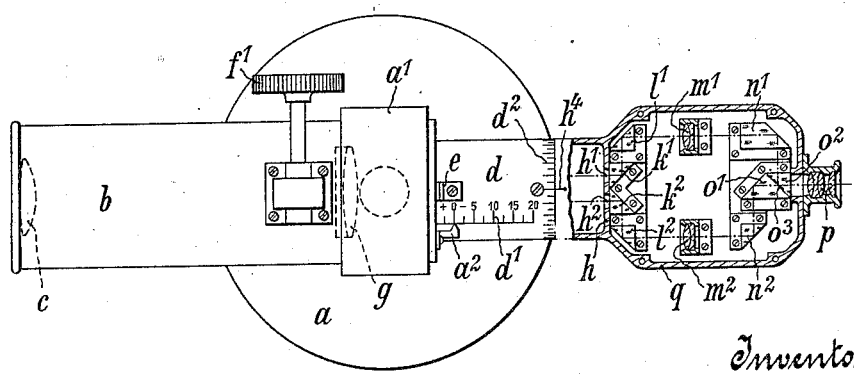

In the drawing the invention is illustrated by constructional example, in which the observing device is formed by a telescope magnifying glass and the illuminating aperture is disposed as a slit immediately next to the two hole diaphragm. Fig. 1 shows a longitudinal section through the entire apparatus and Fig. 2 a plan view, partly in section. On the adjustable stand $a$ by means of a bearing body $a^1$ a horizontal tube $b$ is fixed, which has at its left hand end a collective lens $c$. This lens $c$ represents the collective system, which, brought in front of the eye to be examined, has to form an image of the background of the eye. Within the tube $b$ there is a second, axially displaceable tube $b$, which is guided in two rings $b^1$ and $b^2$ connected with the tube $b$ and can be displaced relatively to the fixed tube $b$ by means of a rack $e$, a pinion $f$ and a milled head $f^1$ fixed to the axle of the latter. An index $a^2$ fixed to the bearing ring $b^2$ permits of the position at any time of the tube $d$ relative to the tube $b$ being read off on a scale $d^1$, which is attached to the outside of the tube $d$ and is numbered in diopters. The tube $d$ forms the carrier for the adjustable telescope magnifying glass serving for the observation and the illuminating device. About in the middle of the tube $d$ there is a collective system $g$ forming the front member of the telescope magnifying glass, the distance of which from an end wall $h$ closing the tube $d$ at the right hand end is equal to the focal length of $g$. The end wall $h$ has two small openings $h^1$ and $h^2$, which lie symmetrically to the centre and represent the two hole diaphragm, this end wall being arranged so as to be rotatable together with the parts fixed to it by means of a lug $h^3$ projecting into the tube $d$ about the optical axis, while the tube $d$ itself is prevented from rotating about the optical axis by the rack $e$. For clamping the rotatable parts relatively to the tube $d$ a clamping screw $i$ is provided. The position at any time of the rotatable parts can be read off by means of an index $h^4$ on a scale $d^2$ on the outer surface of the tube $d$. Behind each of the two apertures $h^1$ and $h^2$ of the end wall $h$ there is a reflecting prism $k^1$ and $k^2$ respectively, which, together with a further, similar reflecting prism $l^1$ and $l^2$ respectively displaces the entering ray pencil system parallel to itself towards the outside. Each ray pencil system then passes through a lens system $m^1$ and $m^2$ respectively, which represents the telescope objective, and is again deflected through 90° by a reflecting prism $n^1$ and $n^2$ respectively and is transmitted to a separating prism system. The separating prism system consists of a right-angled reflecting prism $o^1$, on one cathetal side of which a second, smaller right-angled reflecting prism $o^2$ is cemented. In the middle of the cement surface there is a small rectangular reflecting coating $o^3$, which transmits the middle part of the rays coming from the prism $n^1$ to an orthoscopic ocular $p$, while the rays coming from the prism $n^2$, after being reflected at one of the cathetal surfaces of the prism $o^1$, enter through the uncoated outer part of the cement surface into the ocular $p$. In the field of view of the ocular $p$ there will thus appear in a central, window-shaped part that image, which the rays entering through the diaphragm aperture $h^1$ form, while the remaining outer part of the field of view is filled by the image formed by the rays of the diaphragm aperture $h^2$. All the prisms and the objectives $m^1$ and $m^2$ are housed in a flat casing $q$ fixed to the end wall $h$, which also carries the ocular $p$, so that the observing device is rotated simultaneously with the two hole diaphragm. To the end wall $h$ there is further fixed by means of a tubular extension $h^5$ the illuminating device. This consists of an electric glow lamp $r$ with a straight filament two collective lens systems $s^1$ and $s^2$ and a reflecting prism $t$ immediately above the apertures $h^1$ and $h^2$, the reflecting front surface of which is covered by a piece of thin metal $t^1$ in such a manner that only the lower edge with a narrow horizontal slit $t^2$ remains free. An image of the filament of the glow lamp is formed by the lens systems $s^1$ and $s^2$ in the slit $t^2$, while an image of the slit $t^2$ itself, together with one of the diaphragm apertures $h^1$ and $h^2$, is formed by the collective systems $c$ and $g$ in the pupil of the eye to be examined. On the upper end surface of the lens system $s^1$ a sighting mark consisting of crossed lines $s^3$ is fitted, an image of which is formed in infinity by the lens system $s^2$, so that a collimator is thus formed, which presents to the eye to be examined, accommodation being relaxed, a distinct image of the mark, when the telescope magnifying glass is set to the image of the background of the eye formed by the system $c$.

When the apparatus is in use, it is placed in front of the eye to be examined in such a manner that the optical axis of the apparatus coincides with the axis of the eye and the distance of the lens $c$ from the principal point of the eye is equal to the focal length of $c$. By thus placing the apparatus, an image of the two hole diaphragm with the illuminating slit above it is formed in the pupil of the eye, independently of the position in each case of the telescope magnifying glass. Thereupon, after setting the rotatable observing part to the meridian, in which the measurement is to be made, the telescope magnifying glass is displaced by rotating the disk $f^1$, until in the field of view of the ocular $p$ the two partial images of the background of the eye constitute a uniform image, viz until coincidence is established between the two images, (the two partical images of the cross lines projected to the background also coinciding) whereby the telescope magnifying glass is set to the image formed by $c$ of the background of the eye. The corresponding refractive value of the principal point of the eye can then be read off on the scale $d^1$. In the drawing the adjustable parts are drawn in the position in which they correspond to a normal eye, when a measurement is made in the horizontal meridional plane. The image of the background of the eye formed by $c$ then lies in the focal plane of $c$, so that the distance of the system $g$ from $c$ equals the sum of the two focal lengths.

I claim:

1. In an apparatus for the objective measurement of the refractive value of the principal point of the eye a two-hole diaphragm, an optical system adapted to form a real image of the said two-hole diaphragm in the pupil of the eye to be observed, an ocular, optical means adapted to form two images produced by the two ray pencil systems, separated by the said two-hole diaphragm in the image field of the said ocular, and a prism system located in front of the ocular and adapted to combine the said two images so as to be contiguous to each other.

2. In an apparatus for the objective measurement of the refractive value of the principal point of the eye a two-hole diaphragm, an optical system adapted to form a real image of the said two-hole diaphragm in the pupil of the eye to be observed, a source of light serving for the illumination of the background of the eye, an illuminating diaphragm disposed immediately beside the said two-hole diaphragm, an ocular, optical means adapted to form two images produced by the two ray pencil systems, separated by the said two-hole diaphragm in the image field of the said ocular, and a prism system located in front of the ocular and adapted to combine the said two images so as to be contiguous to each other.

3. In an apparatus for the objective measurement of the refractive value of the principal point of the eye a two-hole diaphragm, an optical system adapted to form a real image of the said two-hole diaphragm in the pupil of the eye to be observed, a source of light serving for the illumination of the background of the eye, an illuminating diaphragm disposed immediately beside the said two-hole diaphragm, an ocular, optical means adapted to form two images produced by the two ray pencil systems, separated by the said two-hole diaphragm in the image-field of the said ocular, a prism system located in front of the ocular and adapted to combine the said two images so as to be contiguous to each other, the part of the said apparatus facing the observer being so arranged as to be rotatable about the optical axis, and means for coupling the said two-hole diaphragm and the said illuminating diaphragm with the said part.

OTTO HENKER.